No. 635,451.　　　　　　　　　　　　　　　　Patented Oct. 24, 1899.
C. E. TOMLINSON.
BICYCLE.
(Application filed June 2, 1899.)

(No Model.)

Attest:
A. N. Jesbera
John M. Scoble

Inventor:
Charles E. Tomlinson
by Redding, Kiddle & Greeley
Attys.

THE NORRIS PETERS CO., PHOTO-LITHO., WASHINGTON, D. C.

UNITED STATES PATENT OFFICE.

CHARLES E. TOMLINSON, OF SYRACUSE, NEW YORK, ASSIGNOR TO THE BEVEL GEAR WHEEL COMPANY, OF NEWARK, NEW JERSEY, AND HARTFORD, CONNECTICUT.

BICYCLE.

SPECIFICATION forming part of Letters Patent No. 635,451, dated October 24, 1899.

Application filed June 2, 1899. Serial No. 719,055. (No model.)

*To all whom it may concern:*

Be it known that I, CHARLES E. TOMLINSON, a citizen of the United States, residing in Syracuse, county of Onondaga, State of New York, have invented certain new and useful Improvements in Bicycles, &c., of which the following is a specification, reference being had to the accompanying drawings, forming a part hereof.

This invention relates to bicycles or other like vehicles in which the power is transmitted from one part to another through a shaft which is inclosed within a tube, the latter usually constituting one of the frame members of the bicycle.

The object of the invention is to prevent any excessive increase of friction between the transmission-shaft and the inclosing tube if the latter should be indented or otherwise distorted so as to force its wall toward the shaft. In accordance with the invention the space between the shaft and the tube is filled with a relatively soft or yielding material, which in case of distortion of the tube will prevent the wall of the tube from coming into contact with the shaft, but will yield or spread or wear away itself sufficiently to prevent any excessive increase of friction upon the shaft at the point of indentation or distortion.

The invention is illustrated in the accompanying drawings, in which—

Figure 1:
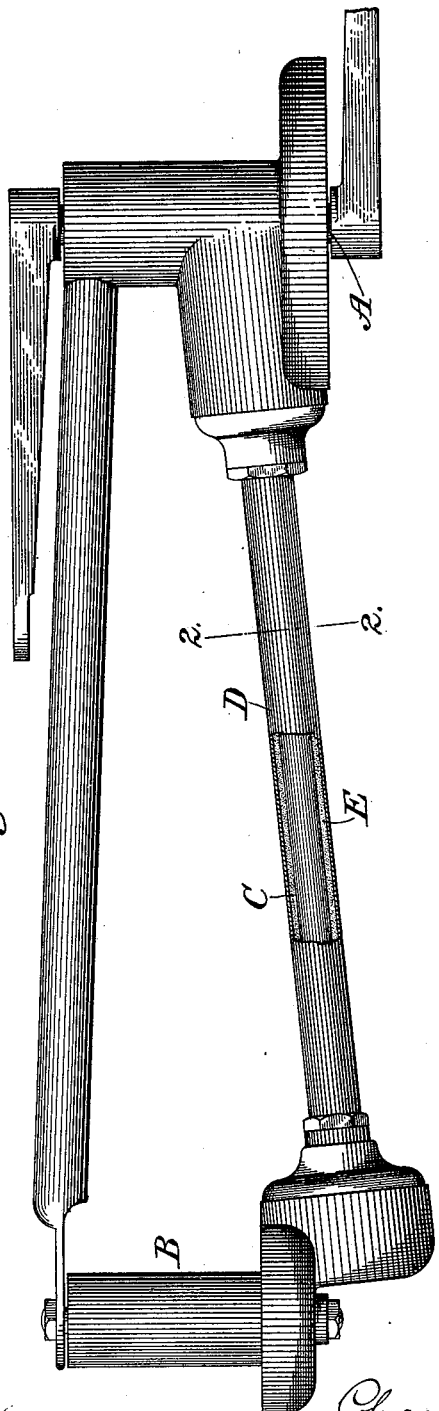
Figure 2:
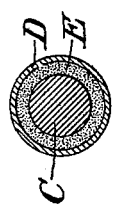

Figure 1 is a plan view of the lower rear fork of a bicycle with the cranks, crank-hanger, and rear-wheel hub, with the inclosing tube partly broken out to show the transmission-shaft within it and the packing or filling between. Fig. 2 is a cross-section of the tube and shaft, also showing the filling.

In the construction represented in the drawings the usual crank-shaft is indicated at A, and the rear driving-wheel hub at B, power being transmitted from one to the other through the usual side shaft C, which is inclosed within the rear-fork side tube D. Suitable gears are interposed between the crank-shaft, side shaft, and rear wheel or axle, as usual, but need not be described or shown herein.

It will be understood, of course, that so far as the application of the present invention is concerned the particular arrangement of the parts above referred to is immaterial, this invention being concerned with the transmission-shaft, however located, and its inclosing tube.

In accordance with this invention the space between the transmission-shaft and inclosing tube is filled with a relatively soft or yielding packing E, which may consist of any one of many materials adapted for the purpose, although ordinary felt is found to serve the purpose very well. The space between the shaft and the tube is not packed tightly with the filling, nor is it of necessity filled completely; but there should be at all points where the tube is liable to be indented or otherwise distorted, so as to force its wall toward the shaft, a layer of the filling or packing of appreciable thickness. When the tube is provided with such a packing or filling, any indentation of the wall of the tube will be resisted by the packing or filling and contact between the indented wall of the tube and the shaft will be wholly prevented, although at the same time the filling or packing will yield or spread or quickly wear away, so as to prevent any material increase of friction upon the shaft at the point of distortion or indentation of the tube.

I claim as my invention—

1. In a bicycle, the combination with a transmission-shaft and an inclosing frame-tube, of a relatively soft filling or packing substantially filling the space between said transmission-shaft and tube and preventing contact between the shaft and tube where the latter is indented or distorted, but yielding or spreading or wearing to prevent excessive friction upon the shaft.

2. In a bicycle, the combination with a transmission-shaft and an inclosing frame-tube, of a filling or packing of felt substantially filling the space between said transmission-shaft and tube and preventing contact between the shaft and tube where the latter is indented or distorted, but yielding or spreading or wearing to prevent excessive friction upon the shaft.

This specification signed and witnessed this 27th day of May, A. D. 1899.

CHARLES E. TOMLINSON.

In presence of—
ALFRED WILKINSON,
MINNIE T. BROWNELL.